Patented Apr. 11, 1944

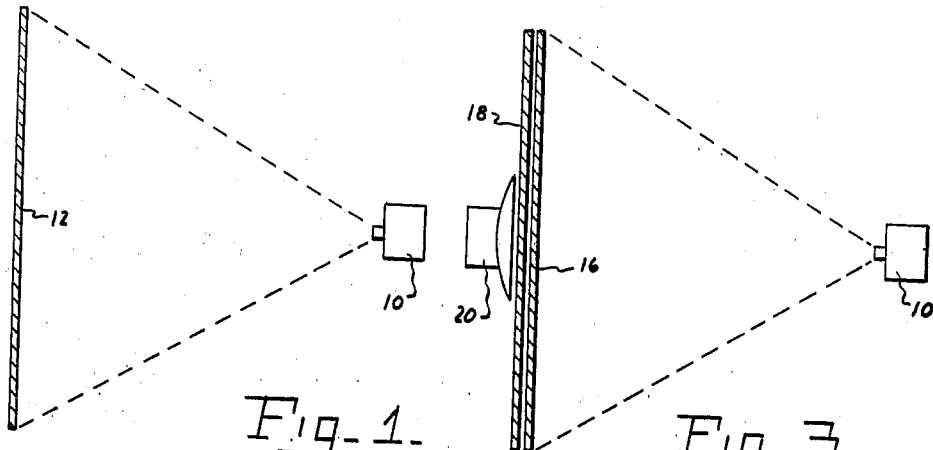
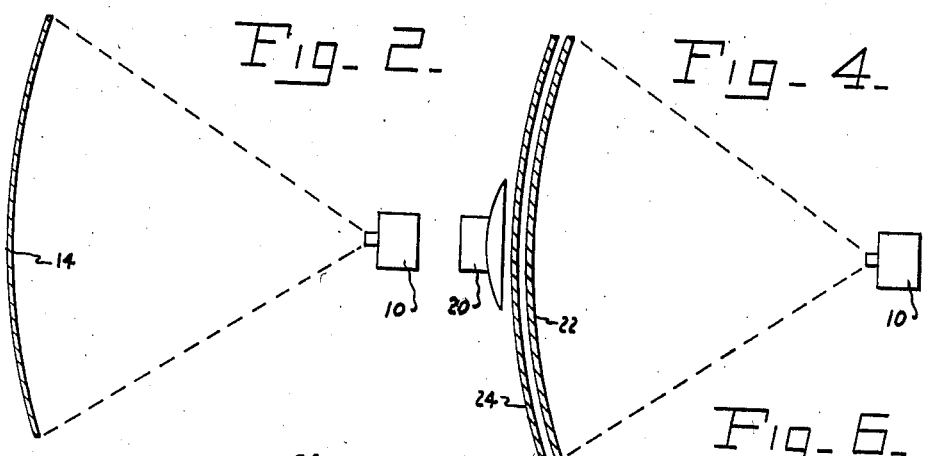
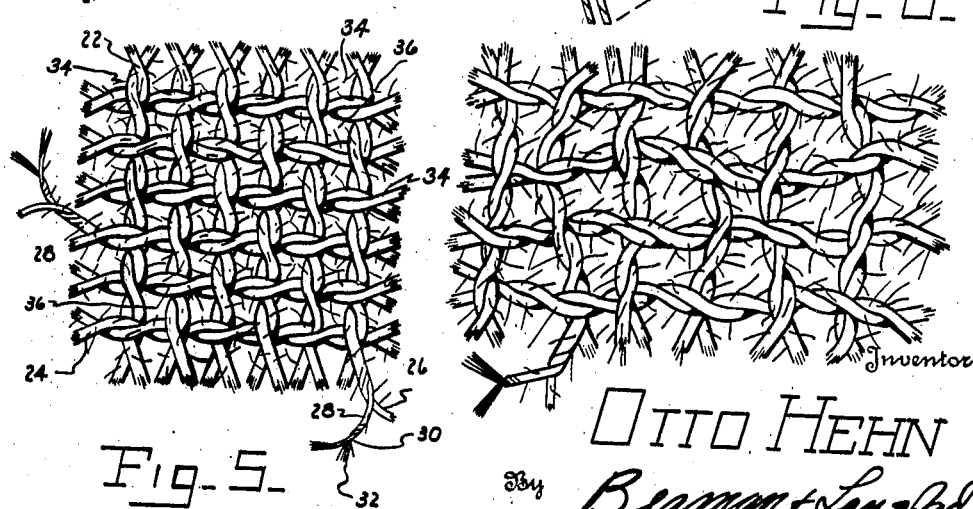

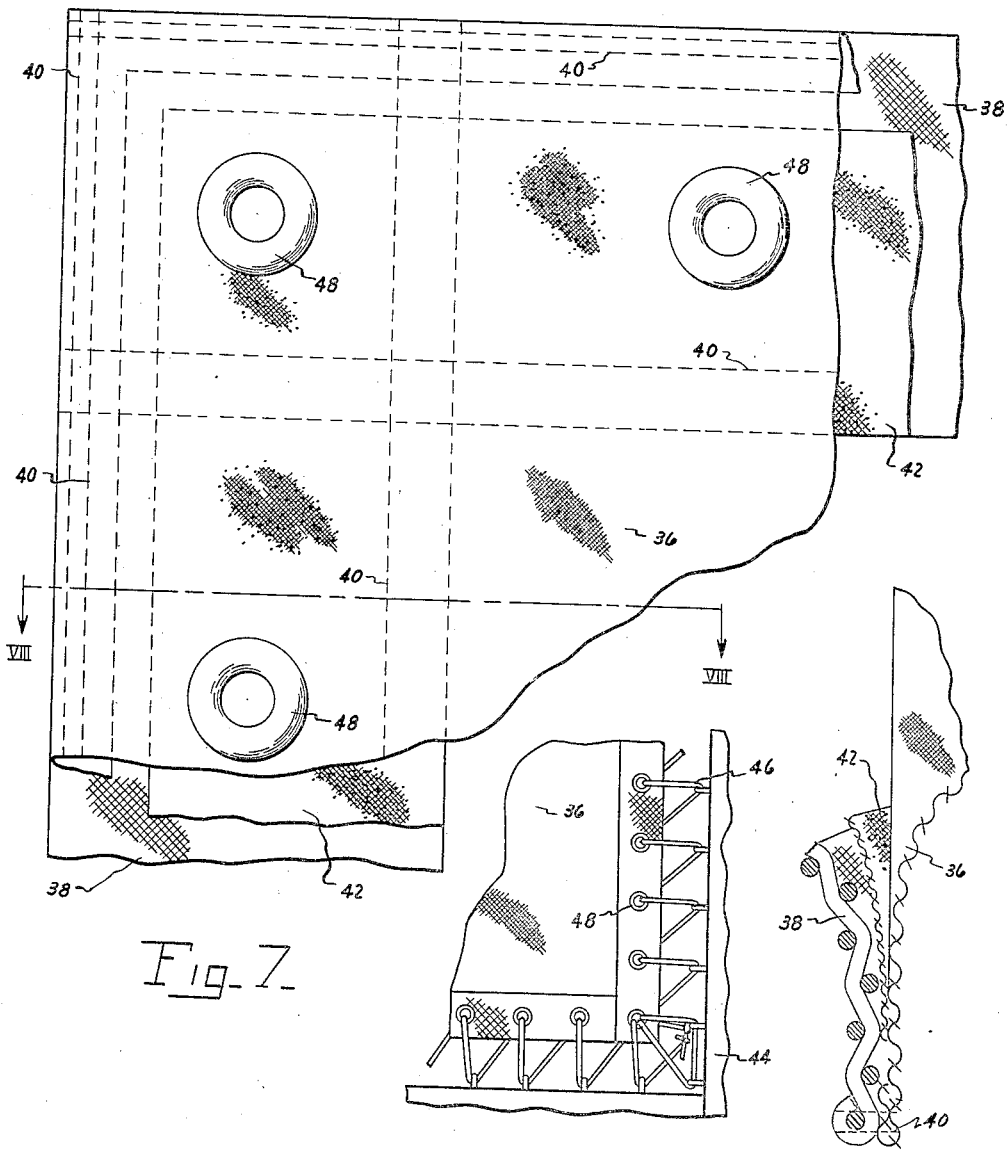

2,346,257

UNITED STATES PATENT OFFICE 2,346,257

PROJECTION SCREEN

Otto Hehn, Jackson, Mich., assignor, by direct and mesne assignments, to The Sparks-Withington Company, Jackson, Mich., a corporation of Ohio Application February 10, 1941, Serial No. 378,119

4 Claims. (Cl. 88—28.92)

The present invention relates to improvements in screens and in particular to projection screens used for reproducing pictures, for example, in cinematography and allied arts, including television, and with or without sound reproducing apparatus.

In the design of a practical projection screen for installation in motion picture theaters, many problems are presented. A great deal of development has been done in connection with the provision of projection screens, particularly with reference to the surfaces thereof, to improve the character of the reflected light which produces the image viewed upon the screen by the audience. For example, glass beads and glass globules embedded or otherwise held in position on the surface of the screen have been proposed and used commercially to increase the diffusion of light and the reflection of the projected light. Also, the surfaces of screens have been treated with crystals, chips and flakes of materials having high light reflection properties. Certain screens of this character which have made their appearance upon the market have not been satisfactory for motion picture theaters. This has been for the reason that the major portion of the reflected light is directed back along the projection light beam, thus restricting the effectiveness of the screen to the audience directly before the screen. When the screen is viewed from the side at an angle, the projected image appears too dark to the observer.

Aside from the expense of fabricating laminated or built up projection screen surfaces of the aforesaid type, such screens are easily damaged and are not readily cleaned. Moreover they are affected by atmospheric conditions. The introduction of sound apparatus has further complicated the fabrication of this type of screen as it now becomes necessary to provide openings for the passage of the sound waves through the screen.

According to one form of the present invention, the projection screen is fabricated from pliable glass cloth woven from threads of glass fiber. Preferably, the warps and wefts of the glass cloth comprise two or more threads twisted together with each thread formed from two or more yarns, the yarns being formed from a large number of extremely fine filaments of glass likewise twisted together. When the screen is to be located between the audience and the sound apparatus, an open weave may be employed in the fabrication of the cloth to permit the passage of sound waves. With a screen of open weave, improved results are obtained when a double screen is employed, one screen being slightly spaced from the other. The following advantages of a woven glass screen over projection screens now in use have been found: (1) The screen may be readily cleaned through the use of any one of many common cleaning solutions, including soap and water; (2) it is strong in tension and highly resistant to rupture by objects thrown against the screen; (3) for the reason that it is unaffected by changes in atmospheric conditions, the woven glass screen is particularly adaptable to curvilinear screens in which the pliable fabric is stretched upon a frame to shape the screen; (4) when traversed by a projected light beam of the normal intensity used in motion picture projection, the glass cloth screen passes to the entire audience a more adequate amount of diffused reflected light and without "screen glare."

Thus, one of the objects of the present invention is to provide an improved screen of the type described comprising the use of glass fiber.

Another object is to provide a screen of the class described fabricated from woven threads of glass fiber.

A further object of the invention is to provide a projection screen for motion pictures with sound effects of open weave glass cloth.

A still further object is to provide a projection screen of woven glass cloth stretched upon a framework to its desired shape with an improved selvage edge for the connection of the glass cloth to the framework.

These and other objects, and advantages of the present invention will become apparent from a consideration of the illustrated embodiments of the invention hereinafter described and disclosed in the accompanying drawings.

In the drawings

Fig. 1 is a diagrammatic representation of a flat screen and projector,

Fig. 2 is a diagrammatic representation of a curvilinear screen and projector,

Fig. 3 is a diagrammatic representation of a double flat screen, disposed between the sound apparatus and the projector, Fig. 4 is a view similar to Fig. 3 of a double curvilinear screen, Fig. 5 is a plan view of a section of the woven cloth with uniform warp and weft, Fig. 6 is a view similar to Fig. 5 of an open work weave in which the position of the warps and wefts are irregular, Fig. 7 is a plan view of one corner of my improved screen of glass cloth showing the selvage reinforcing structure, Fig. 8 is a section taken on line VIII—VIII of Fig. 7, and Fig. 9 is a fragmentary elevational view showing the manner in which the screen is stretched upon its supporting frame.

The principles of the present invention have application to projection screens of all sizes and shapes and to background as well as to front projection. For a complete understanding of the present development, in the description to follow, it has been found convenient to make reference to specific screen sizes, weaves of cloth and sizes of threads and yarn. It is not my intention, however, to restrict the broad principles of the present invention through the specific disclosures herein contained. Certain of the features of the present invention have application to flat screens as well as curvilinear screens used with or without sound apparatus. Other features of the invention are particularly adapted to curvilinear screens and to screens used with sound apparatus, television, etc.

Referring to the drawings, in Figs. 1 to 4 are diagrammatically represented projectors, screens, and sound apparatuses. The preferred construction of the curvilinear screens diagrammatically represented is disclosed in my co-pending application Serial No. 403,676, filed July 23, 1941. In these several figures, the projector is indicated by the reference character 10. The indication of the flat screen 12 of Fig. 1 and the curvilinear screen 14 of Fig. 2 with respect to the projector and the observer may be considered as representing both front and background projection. Fig. 3 shows a pair of spaced flat screens 16 and 18, located between the projector 10 and the sound apparatus generally designated 20. In Fig. 4 the spaced screens 22 and 24 are curvilinear and preferably conform to the disclosure of my aforesaid copending application.

To first describe the broadest phase of the present invention, namely, the use of glass fiber in the fabrication of projection screens, it is advisable to briefly treat the manufacture of the thread. The mechanics of making yarn of fibrous glass is disclosed in the Slayter and Thomas Patent No. 2,133,238. The glass in a fluid state flows through a nozzle comprising a large number of very fine holes resulting in the formation of hair-like filaments, which are in parallel arrangement as they leave the nozzle. In practice the diameters of the filaments are of the order of .0001" to .0003". This bundle of hair-like filaments is twisted to form the yarn. Two or more yarns are then twisted upon each other to form the resulting thread which is woven to form the glass cloth in a usual manner. For the reason that the filaments are relatively brittle, upon twisting, the otherwise substantially continuous filaments, are broken into irregular lengths which may be compared with the staple of cotton and woolen yarn, although the glass filaments are generally much longer. Further reduction in length of a percentage of surface filaments of the threads undoubtedly takes place at the time of weaving due to abrasion of the shuttle, heddles, reed, etc. Another characteristic of filaments of glass fiber is the fact that they do not take a set upon twisting with the result that when released, the filament always tends to straighten out. This characteristic makes it advisable to arrange the twist of the yarn and of the thread therefrom so as to counteract this tendency. The glass from which commercial projection screens have been manufactured to date under the present invention, prior to being manufactured, has a greenish cast with respect to color. The threads in the resulting fabric made from the fibrous glass, however, are substantially pure white in appearance. It is anticipated that projection screens other than white may be desired and it is for this reason that I do not care to limit myself to any particular color as it is anticipated that silver, gray and other colors, hues and shades, both pleasing and restful to the vision, may be used.

Where the projection screen is of relatively small size as in the case of home projection screens or is not to be used in combination with sound apparatus located behind the screen with respect to the audience, a closely woven glass fabric is preferable to an open weave. However, in the manufacture of screens to be used in motion picture theaters of average capacity with sound apparatus, a fabric of a more open weave is preferable if the sound source is back of the screen.

By way of example, a woven glass screen of sufficient size to project a picture 16 feet by 21 feet may be fabricated from glass cloth having similar warps and wefts threads, approximately 25 to the inch and of approximately .02" in diameter and spaced from each other a distance approximating their diameter. Such a fabric is illustrated in Fig. 5 wherein the warps 22 and wefts 24 are shown woven in a one to one pattern and spaced to provide a relatively open weave. As shown each warp thread comprises two twisted threads 26 and 28 which in turn comprise twisted yarns 30 and 32. The resulting fabric is relatively soft and pliable and is extremely strong in tension. While the fabric appears to be of hard finish and without nap, when casually inspected, upon close examination, it will reveal that over the entire surface of the warps and wefts 22 and 24, are closely spaced projecting ends 34 of ruptured filaments of the glass fiber. These ends 34 extend in all directions including into and across the interstices 36 between the warps and wefts. The distance of projection of the ends 34 will vary considerably as may be expected. Generally speaking, however, the major portion of the ends 34 do not project more than $\frac{1}{16}$" from the warp or weft thread in which they are anchored. Because of the fineness of the filaments of the glass fiber, the fabric does not have the appearance of having a nap. Moreover, the projecting ends 34 do not interfere with the cleaning of the fabric nor materially increase the tendency of the fabric to accumulate dust when suspended in a vertical position and used as a projection screen.

Without limiting the present invention to a particular theory, it would appear that the improved properties of glass fabric as a projection screen are attributable to the reflection and diffusion of light produced by the minute glass rods of helical configuration which make up the body of the threads and yarns in a twisted state as well as by the minute straight glass fibers extending in all directions and defined by the ends 34.

Using a 150 watt spotlight as source of projecting light and located at five and one-half feet from the screens tested, the following comparative readings were taken upon a sensitive foot candle light meter located directly in front of each screen at a distance of two feet:

| Screen | Screen material | Reflected light in foot candles |
| --- | --- | --- |
| A | Closely woven glass (white) | 30 |
| B | Open woven glass (white) | 22 |
| C | Closely woven rayon (white) | 19 |
| D | Closely woven Celanese (white) | 17 |

The reflection of light from both the closely woven and the open woven glass screens A and B within the angular range of the audience of the usual motion picture theater was found to be substantially equal to that directly in front of the screen and in every test proportionally greater than in the case of the screens C and D.

The fabric of the screens A, B, C and D, with reference to color, were all of the same degree of whiteness; screens C and D being of artificial silk having a substantially greater surface sheen than the glass cloth and suggesting prior to actual tests that the screens C and D would have greater light reflecting properties.

The fabric shown in Fig. 5 as described may be used in large commercial screens of the type described as a single screen as shown in Figs. 1 and 2. However, there is a definite advantage as illustrated in Figs. 3 and 4 in using a double screen. In such an arrangement, two fabrics, preferably both of open weave are suitably supported in uniform slightly spaced relation. From Figs. 3 and 4, it will be noted that the sound apparatus is located back of the screen and that the sound comes to the audience by being projected through the screen. In practice, each screen section may be fabricated from a similar fabric, as for example, from that shown in Fig. 5, or the fabrics may be of different weaves. For example, in practice there is some indication that improved sound effects are obtained by having the screen sections 18 and 24 directly adjacent the sound apparatus of an irregular weave having the effect of breaking up the sound waves as they emanate from the speakers. Such a fabric is illustrated in Fig. 6; the fabric shown being on a greater scale than that of Fig. 5 for the purpose of illustrating the irregular manner in which the warps and wefts are arranged with relation to one and another. In actual practice the size of the threads and the open area of the weave are substantially those of the fabric of Fig. 5. Referring to Figs. 3 and 4, it is to be understood that the spacing between the screen sections 16 and 18, and 22 and 24 is very slight and may be varied within a range of several inches depending upon the projection angle. This arrangement provides what might be termed an acoustic chamber between the two screen sections and materially improves the sound effects. The screen sections should not be spaced at too great a distance as this has the effect of creating halations about the projected images of the front screen sections 16 and 22.

In view of the uniformity of the diffusion and reflection of the light from the projector throughout the angular range of the audience in the case of a screen fabricated from glass threads, it is particularly adapted to the manufacture of curvilinear projection screens. While it is true that many curvilinear projection screens have been proposed, there has been no general adoption of such type of screen. As more fully disclosed in my aforesaid copending application, in order to employ a pliable fabric in connection with the construction of a curvilinear screen, it is necessary that the screen be tensioned throughout its border from a suitable supporting frame. This requires the reinforcing of the fabric around its marginal edges and the provision of suitable grommets to enable the screen to be laced and tensioned upon the framework. In the case of glass fabric, it was found that because of slipperiness of the yarns caused by the smoothness of the individual fibers, it is difficult to sew, in the usual manner. When applying a reinforcing tape throughout the marginal edge of the projection screen in which the grommets are located, the action of the sewing machine was such that the majority of the warps and wefts were ruptured by the sewing operation along the line of stitching. To overcome this difficulty, it was necessary to develop a new technique in connection with the reinforcement of glass cloth.

Referring to Figs. 7 to 9, the marginal edges of the fabric 36 constituting the projection screen woven from threads of glass fiber are reinforced by strips of heavy webbing 38 secured by lines of stitching 40. Prior to the stitching of the webbing 38 to the main fabric body 36, a web of fabric 42, preferably of glass material, is cemented to the fabric 36 through the use of rubber cement or other suitable adhesive. This brings about an interlocking between the fabrics 36 and 42 of such a nature that when the fabric 36 is stitched to the webbing 42, the reinforcement inwardly of the innermost line of stitching 40 provides the fabric 36 with an adequate amount of strength to permit firm tensioning of the fabric 36 from the framework 44 as shown in Fig. 9 through flexible lacing 46 threaded through the grommets 48.

It is to be understood in making reference to theater and home projection screens, it is my intention to include television projection as well as projection through the use of the conventional motion picture projector. Also, the principles of the present invention are equally advantageous in connection with the projection of still pictures. Moreover, the use of projection screens of glass fiber in connection with colored pictures as distinguished from black and white appears to make the colors more vivid and of a richer tone. In addition, there seems to be some tendency for the colors to appear more natural upon the glass fiber screens when compared with screens now in extensive use in motion picture theaters. Research to date has not developed any accepted explanation for this apparent phenomenon. However, it is possible that refraction and filtering of the colored light may be responsible.

To reduce cost of fabrication and for other reasons, it is possible to use glass fiber threads as warps or wefts only and to substitute cotton or any other suitable less expensive thread for the warp or weft. I also anticipate screens woven from a composite thread of glass fiber and other material such as cotton, rayon, etc.

It has been heretofore mentioned that one of the advantages of a woven glass fiber projection screen is the fact that it is not materially affected by changes in atmospheric conditions. Changes in temperature and humidity have little effect upon glass fabric as compared with other fabric material. It does not appreciably shrink upon laundering nor does it stretch when tensioned upon a framework so as to become wrinkled or baggy upon increase in humidity.

With reference to the improvement in sound effects through the use of two spaced screens of openwork construction, it is believed that the screen sections in their spaced relation define a high frequency acoustic filter which modify certain objectionable high frequency imperfections in the sound reproduction. Observers characterize the screen as removing the "metallic" effects noticeable in the human voice with the sound being projected through a conventional single screen section. Glass fabric appears to be particularly well adapted for carrying out this improvement, however, as to this particular phase of the invention I do not wish to be limited to any specific material for the construction of the openwork screen sections.

Having described my invention, what I desire to secure by Letters Patent and claim is:

1. A projection screen of the class described of flexible woven glass fabric of twisted glass fiber capable of being tightly stretched on a framework, the marginal edges of the fabric being reinforced, and comprising cemented plies of flexible material.

2. A projection screen of the class described of flexible woven glass fabric capable of being tightly stretched upon a framework, said fabric having reinforced marginal edges, including a heavy webbing stitched to the main screen fabric, and a reinforcing ply of material cemented to said main screen body and sewed to said webbing along with said main screen body.

3. In a flexible projection screen having a marginal framework for marginally tensioning the screen, the screen being woven from threads comprising glass fiber and characterized by their slipperiness and brittleness, a marginal reinforcing structure for the screen comprising a marginal strata of the main woven screen body, a flexible reinforcing means imposed upon said marginal strata, and means cementitiously uniting the glass fiber threads to the face of said reinforcing means.

4. A flexible projection screen of woven glass fiber characterized by its brittleness and slipperiness, marginal portions of said screen being in the form of cemented layers, and a relatively heavy, flexible, reinforcing member sewed to said cemented layers.

OTTO HEHN.